United States Patent [19]

Sakakibara et al.

[11] Patent Number: 5,874,951
[45] Date of Patent: Feb. 23, 1999

[54] DRAWING COMMUNICATION APPARATUS USING TIME STAMPS THAT INDICATE AN ORDER OF OCCURRENCE OF OPERATION EVENTS

[75] Inventors: Masayoshi Sakakibara; Hiroshi Katsurabayashi, both of Kanagawa, Japan

[73] Assignee: Fuji Xerox Co., Ltd., Tokyo, Japan

[21] Appl. No.: 718,012

[22] Filed: Sep. 3, 1996

Related U.S. Application Data

[63] Continuation of Ser. No. 397,040, Feb. 27, 1995, abandoned.

[30] Foreign Application Priority Data

Feb. 28, 1994 [JP] Japan ...................................... 6-52623

[51] Int. Cl.⁶ ...................................................... G06F 15/00
[52] U.S. Cl. ........................... 345/302; 345/329; 345/331
[58] Field of Search .................................... 395/806, 329, 395/330, 331, 332, 340, 344, 185.01, 185.03, 185.07, 608, 610, 615, 617, 200.34, 200.37, 200.6, 200.68; 348/13; 370/230, 503; 345/302, 329, 330, 331, 332, 340, 344

[56] References Cited

U.S. PATENT DOCUMENTS

| 5,065,343 | 11/1991 | Inoue ...................................... 395/162 |
| 5,176,520 | 1/1993 | Hamilton ................................ 434/350 |
| 5,195,086 | 3/1993 | Baumgartner et al. ................... 370/62 |
| 5,228,137 | 7/1993 | Kleinerman et al. .................... 395/500 |
| 5,239,373 | 8/1993 | Tang et al. ................................ 348/14 |
| 5,241,675 | 8/1993 | Sheth et al. .............................. 395/600 |
| 5,305,311 | 4/1994 | Lyles ......................................... 370/60 |
| 5,309,555 | 5/1994 | Akins et al. .............................. 395/330 |
| 5,315,703 | 5/1994 | Matheny et al. ......................... 395/164 |
| 5,331,330 | 7/1994 | Susnjara ................................... 342/460 |
| 5,355,372 | 10/1994 | Sengupta et al. ....................... 370/238 |
| 5,392,400 | 2/1995 | Berkowitz et al. ...................... 395/200 |
| 5,392,421 | 2/1995 | Lennartsson ............................. 395/550 |
| 5,408,470 | 4/1995 | Rothrock et al. ....................... 370/261 |
| 5,442,788 | 8/1995 | Bier .......................................... 395/344 |
| 5,485,457 | 1/1996 | Aramaki ................................... 370/238 |

FOREIGN PATENT DOCUMENTS 4-241054  8/1992  Japan .

OTHER PUBLICATIONS

Ahuja et al., "A comparison of application sharing mechanisms in real time desktop conferencing systems", Proceedings of COIS'90, 1990, pp. 238–248.

Ishii et al., "Design of TeamWorkStation: A realtime shared workspace fusing desktops and computer screens", In Proceedings of IFIP WG8.4 Conference on Multi–User Interfaces and Applications (Crete, Sep. 1990), pp. 131–142.

Primary Examiner—Steven S. Hong
Attorney, Agent, or Firm—Finnegan, Henderson, Farabow, Garrett & Dunner, L.L.P.

[57] ABSTRACT

An internal clock generates time stamps indicating an order of occurrence of operation events in a drawing communication apparatus. Data of operation events that occurred in another apparatus are transmitted to the drawing communication apparatus together with time stamps. The data of the operation events that have been input to the drawing communication apparatus or transmitted from the other apparatus are stored together with the time stamps. When a contradiction is detected between an order of receptions of the operation events and an order of the time stamps, the processing order of contradiction-detected operation events are corrected based on their time stamps.

2 Claims, 11 Drawing Sheets

DRAWING COMMUNICATION APPARATUS USING TIME STAMPS THAT INDICATE AN ORDER OF OCCURRENCE OF OPERATION EVENTS

This application is a continuation of application Ser. No. 08/397,040, filed Feb. 27, 1995, now abandoned.

BACKGROUND OF THE INVENTION

The present invention relates to a drawing communication apparatus and, more specifically, to a drawing communication apparatus which allows a plurality of terminal devices to share display contents.

In recent years, to smoothly establish mutual understanding with a person who is in a distant location, computer systems have been constructed which allow a plurality of terminal devices to share display contents through a network, or the like. In these computer systems, drawing data as an object of writing and erasure is shared by at least two terminal devices.

In a conventional drawing communication apparatus which allows sharing of drawing data that is input by, for instance, hand writing, a control method is employed which permits only one terminal device to input data at a time. However, this control method needs complex control processing in determining an input-permitted terminal device among a number of terminal devices.

To solve this problem, there has been proposed, for instance, a drawing communication apparatus disclosed in Japanese Unexamined Patent Publication No. Hei. 4-241054. This drawing apparatus has two kinds of drawing means, i.e., writing-type and erasure-type drawing means. A terminal device stores writing-type drawing data, and when receiving erasure-type drawing data from another terminal device, it performs erasure processing after redrawing writing-type drawing data that have occurred after occurrence of the previous erasure-type drawing data. This apparatus permits a plurality of terminal devices to input data at the same time. That is, the above problem is solved by redrawing an accumulated difference when receiving erasure-type drawing data or a signal indicating completion of an erasure-type drawing mode (pen off).

For example, as shown in FIG. 1, if a region b is erased from a drawing image of a first terminal device at T11 and then a vertical line segment c is written to a drawing image of a second terminal device at time T12, there occurs, at time T14, a difference between a drawing image 11 of the first terminal device and a drawing image 21 of the second terminal device. The difference occurs at a portion of the line segment c that belongs to the region b. Subsequently, if an oblique line segment d is written to the drawing image of the second terminal device at time T15 and immediately thereafter (at time T16) a region e of the drawing image is erased from the drawing image of the first terminal device, at time T17 the first and second terminal devices have drawing images 12 and 22, respectively.

In the drawing images 12 and 22 of the first and second terminal devices, although the difference in the region b is removed by redrawing, another difference has occurred in the part of the line segment d included in the region e. If the next operation event, for instance, a signal indicating completion of the erasure-type drawing mode (pen off) is thereafter sent from the first terminal device, redrawing is effected in the second terminal device, to remove the difference in the region e. Thus, the display contents of the first and second terminal devices become identical.

However, in the conventional control method described above, as shown in FIG. 1, although accumulated differences are removed by redrawing, there is a possibility that a difference may still exist somewhere as long as there is a terminal device operating in an erasure-type drawing mode.

Further, when the above control method is applied to a drawing communication apparatus dealing with color information, the following problem will occur. For example, as shown in FIG. 2, when a blue horizontal line (light portion in FIG. 2) that is drawn on a drawing screen 10 of a first terminal device and a red vertical line (dark portion in FIG. 2) that is drawn on a drawing screen 20 of a second terminal device intersect each other, a difference that is generated by writing-type drawing cannot be removed.

SUMMARY OF THE INVENTION

The present invention has been made in view of the above circumstances, and has an object of providing a drawing communication apparatus which allows at least two terminal devices to share drawing data as an object of operations such as writing and erasure and which, according to the invention, can remove a difference between display contents appearing in those terminal devices in a short time.

To attain the above object, according to the invention, a drawing communication apparatus in which drawing data as an object of operation events such as writing and erasure is shared by at least two drawing communication apparatuses, comprises:

code generating means for generating codes indicating an order of occurrences of operation events in the at least two apparatuses;

drawing data storing means for storing data of the operation events together with the codes;

contradiction detecting means for detecting a contradiction between an order of receptions of the operation events whose data are stored in the drawing data storing means and an order of the codes; and control means for determining, when the contradiction detecting means has detected a contradiction, a processing order of contradiction-detected particular operation events and the other operation events based on codes of the particular operation events.

With the above constitution, the contradiction-detected operation events are performed again in the order of their occurrences. Therefore, a difference between display contents of the at least two apparatuses is corrected quickly, and users can, for instance, hold a meeting while looking at the same display image.

The apparatus may be provided with error correcting means for storing errors of internal clocks incorporated in the at least two apparatuses, and for correcting the codes. For example, where the order of occurrences of operation events are expressed by time stamps, the time stamps are corrected in accordance with the errors of the internal clocks. Therefore, the drawing communication apparatus can be provided which is free of a problem that operation events are given an erroneous order due to errors of the internal clocks, and is superior in ease of operation.

The apparatus may be provided with priority rule storing means for storing rules to be used to determine an order of operation events having the same codes. As a result, when time stamps are the same, the order of occurrences of those operation events is determined commonly for the at least two apparatuses according to the above rules. Therefore, the display contents of the respective apparatuses can be kept the same even where the time stamps have not only relatively long intervals, for instance, one second but also errors.

Further, the apparatus may be provided with drawing data adjusting means for retaining a data storing time during which the operation event data are to be stored in the drawing data storing means, and for removing operation event data that have been stored for more than the data storing time. As a result, past operation event data that do not influence the contradiction detection are removed by the drawing data adjusting means. Therefore, the memory capacity needed by the drawing data storing means can be reduced.

DESCRIPTION OF THE PREFERRED EMBODIMENTS

First Embodiment

Figure 1:
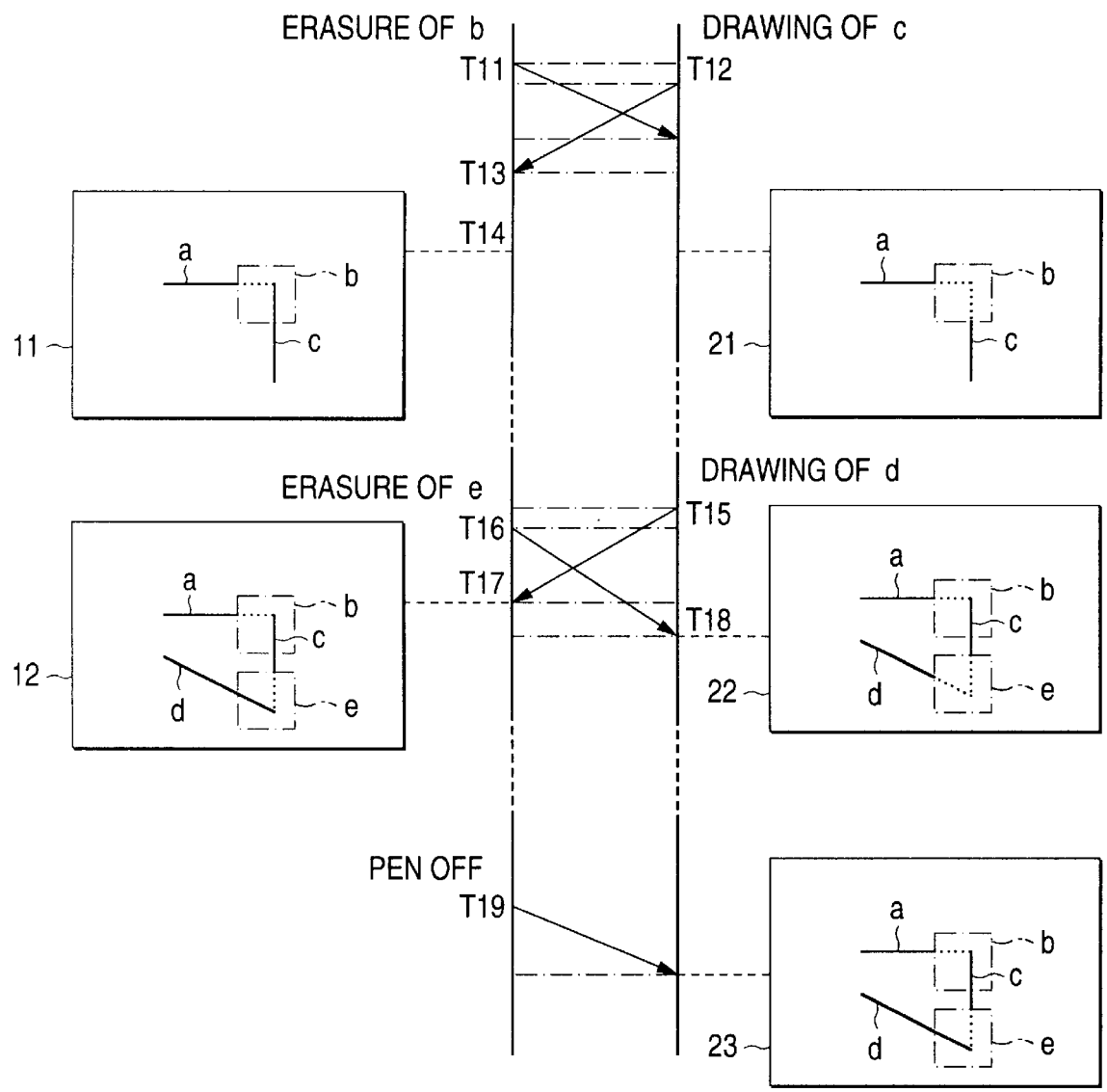
FIG. 1 shows an example of images that are displayed when operations are sequentially performed on common drawing data from two conventional drawing communication apparatuses.
Figure 2:
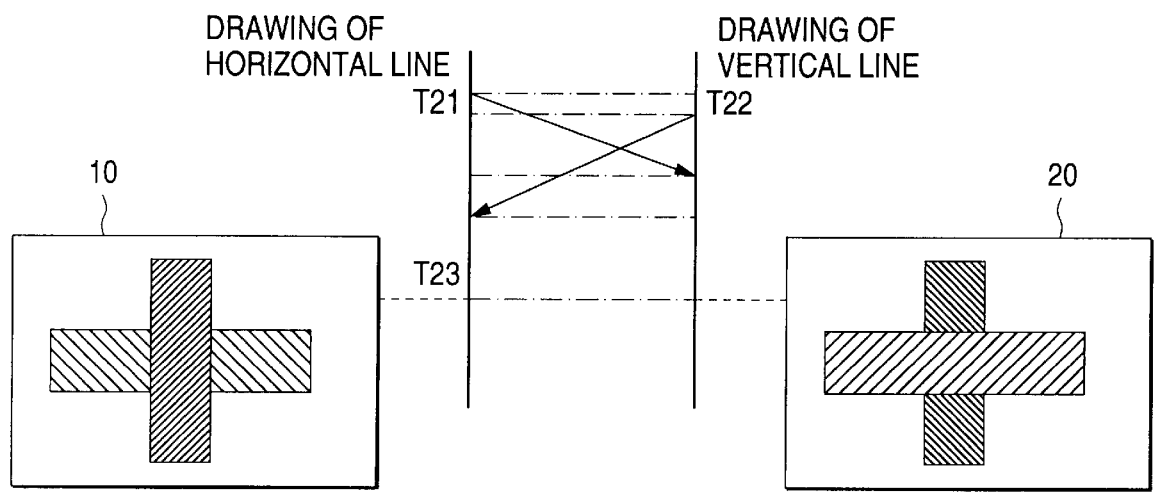
FIG. 2 shows an example of images that are displayed when operations are performed on common drawing data from two conventional drawing communication apparatus.
Figure 3:
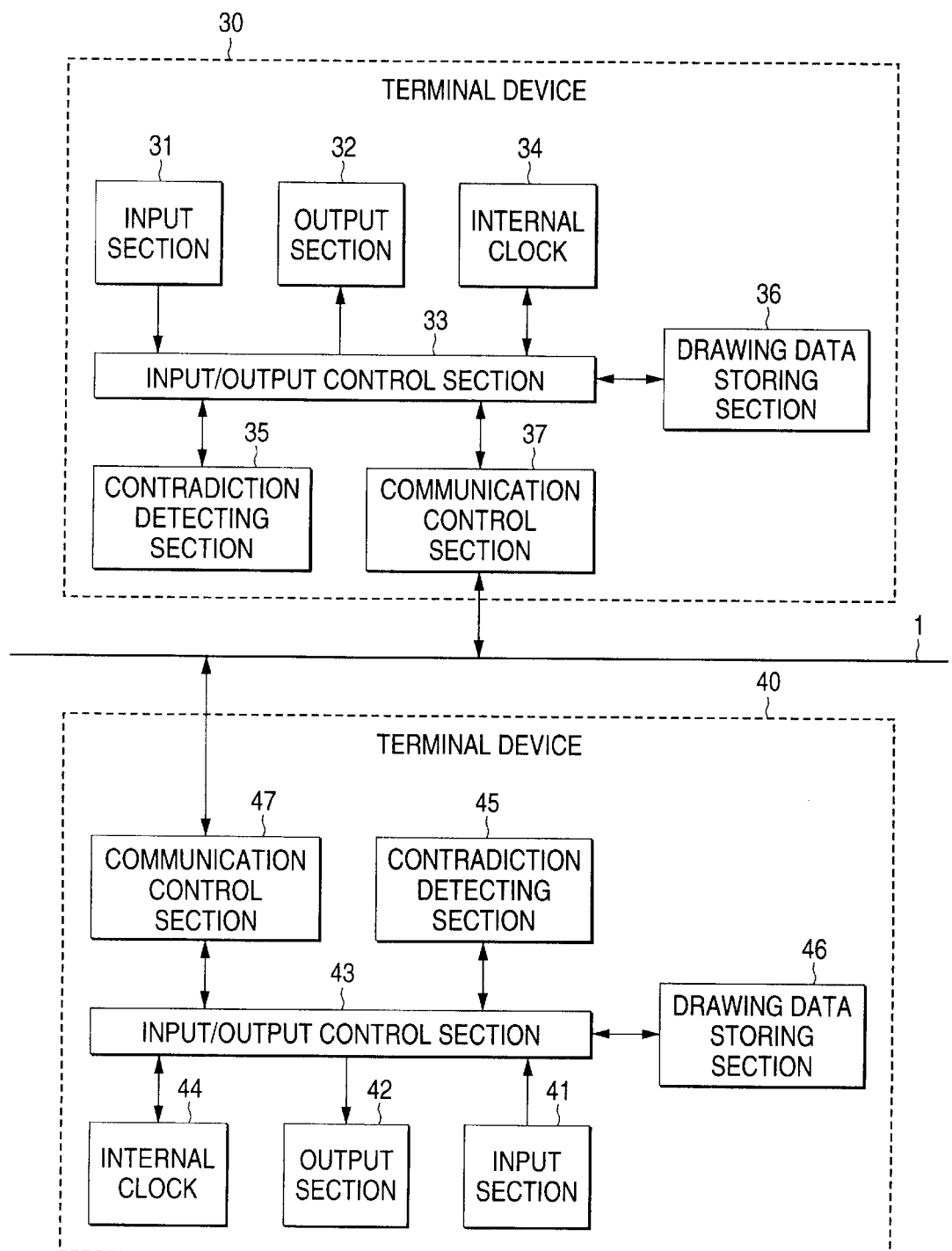
FIG. 3 is a block diagram showing a configuration of the main part of a drawing communication apparatus according to a first embodiment of the present invention.

FIG. 3 is a block diagram showing a configuration of the main part of a drawing communication apparatus according to a first embodiment of the present invention. In FIG. 3, a plurality of drawing communication apparatuses including a first terminal device 30 and a second terminal device 40 are connected to a communication line 1. The following description will be directed to the first terminal device (drawing communication apparatus) 30 unless it is necessary to describe other terminal devices for some specific purpose.

In the first terminal device (drawing communication apparatus) 30, an input section 31 and an output section 32 are composed of an input/output device such as a keyboard, a mouse, or a display. An input operation of drawing data, display output of a drawing image, input/output of device control information, and other operations are performed through the input section 31 and the output section 32. An internal clock 34 generates a time stamp that is used in a code representing the order of occurrences of operation events. A communication control section 37 performs transfer of drawing data etc. with another drawing communication apparatus, for instance, the second terminal device 40 via the communication line 1. A drawing data storing section 36 stores drawing data received by the input section 31 or the communication control section 37. A contradiction detecting section 35 detects a contradiction between the order of receptions and the order of occurrences of drawing data stored in the drawing data storing section 36, and orders redrawing. An input/output control section 33 controls the entire device by performing data transfer with the respective sections, data processing, and other operations.

Figure 4:
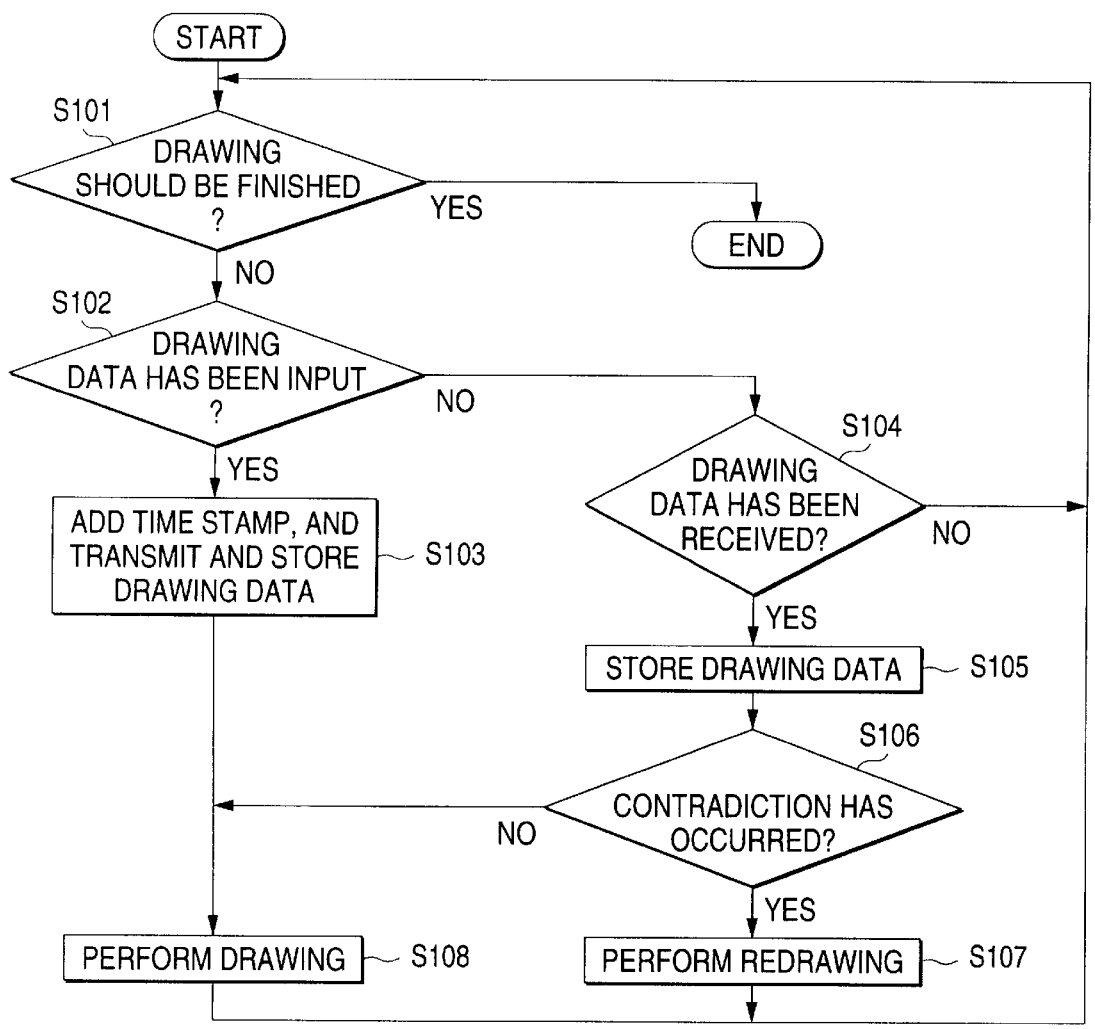
FIG. 4 is a flowchart showing a drawing data input/output process in an input/output control section.

FIG. 4 is a flowchart showing a drawing data input/output process in the input/output control section 33. Referring to FIG. 4, the drawing data input/output process will be described. Upon the start of the process, it is checked in step S101 whether an instruction to finish the drawing process has been made. If the judgment is affirmative, the process is finished. In step S102, it is checked whether drawing data has been input from the input section 31. If the judgment is affirmative, a time stamp generated by the internal clock 34 is added to the drawing data and the resulting data is stored into the drawing data storing section 36 (step S103). The process goes to step S108. If there is no input of drawing data (step S102), it is checked whether drawing data has been received from another device through the communication control section 37 (step S104). If the judgment is negative, the process returns to step S101.

If drawing data has been received (step S104), it is stored into the drawing data storing section 36 (step S105). In step S106, it is checked by a contradiction detecting process (described later with reference to FIG. 5) whether there exists a contradiction between the received drawing data and the previously stored drawing data. If there exists a contradiction, a redrawing process (described later with reference to FIG. 6) is performed in step S107. If there is no contradiction, or if drawing data received by the input section 31 has been processed, drawing is effected in the output section 32 based on the input drawing data (step S108). The above series of operations is repeated until an instruction to finish the drawing process is given (step S101).

Figure 5:
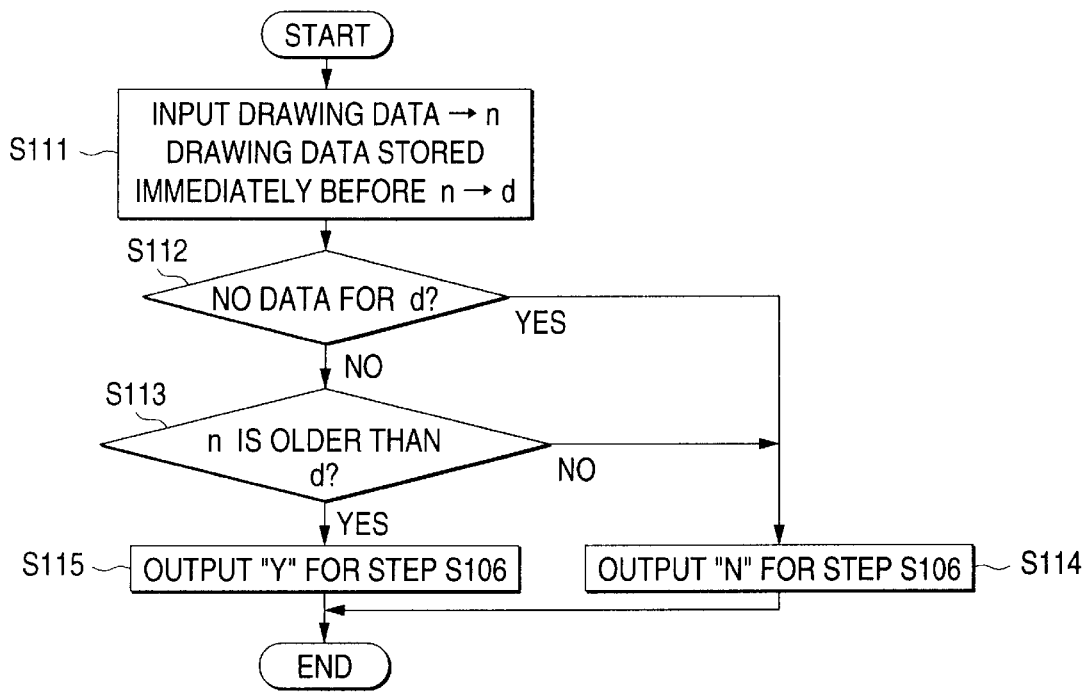
FIG. 5 is a flowchart showing a contradiction detecting process on drawing data stored in a drawing data storing section.

FIG. 5 is a flowchart showing the contradiction detecting process on the drawing data stored in the drawing data storing section 36. Referring to FIG. 5, the image data contradiction detecting process will be described. Upon the start of the process, input drawing data is represented by n and drawing data that was stored immediately before is represented by d (step S111). If there is no data for d (step S112), or if it is judged by a time stamp comparison that the data n is not older than the data d (step S113), "N" is output for the judgment step S106 (see FIG. 4) in step S114. Otherwise, "Y" is output (step S115). And the process is finished.

Figure 6:
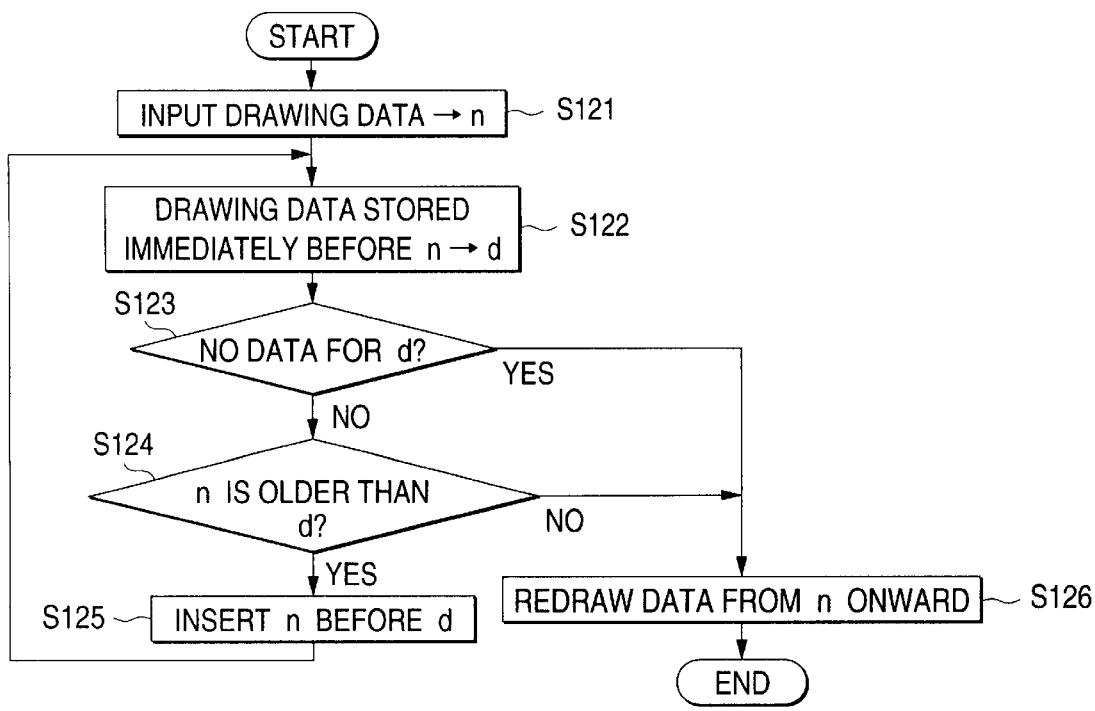
FIG. 6 is a flowchart showing a redrawing process that is performed when a contradiction is detected.

FIG. 6 is a flowchart showing the redrawing process that is performed when a contradiction is detected. Referring to FIG. 6, the redrawing process on the drawing data will be described. Upon the start of the process, as in the above-described process, input drawing data is represented by n (step S121) and drawing data that was stored immediately before is represented by d (step S122). If there exists data for d (step S123), and if it is judged by a time stamp comparison that the data n is older than the data d (step S124), the data n is placed before the data d (step S125) and the process returns to step S122. Otherwise, redrawing is sequentially effected in the output section 32 based on the drawing data n onward (step S126).

Figure 7:
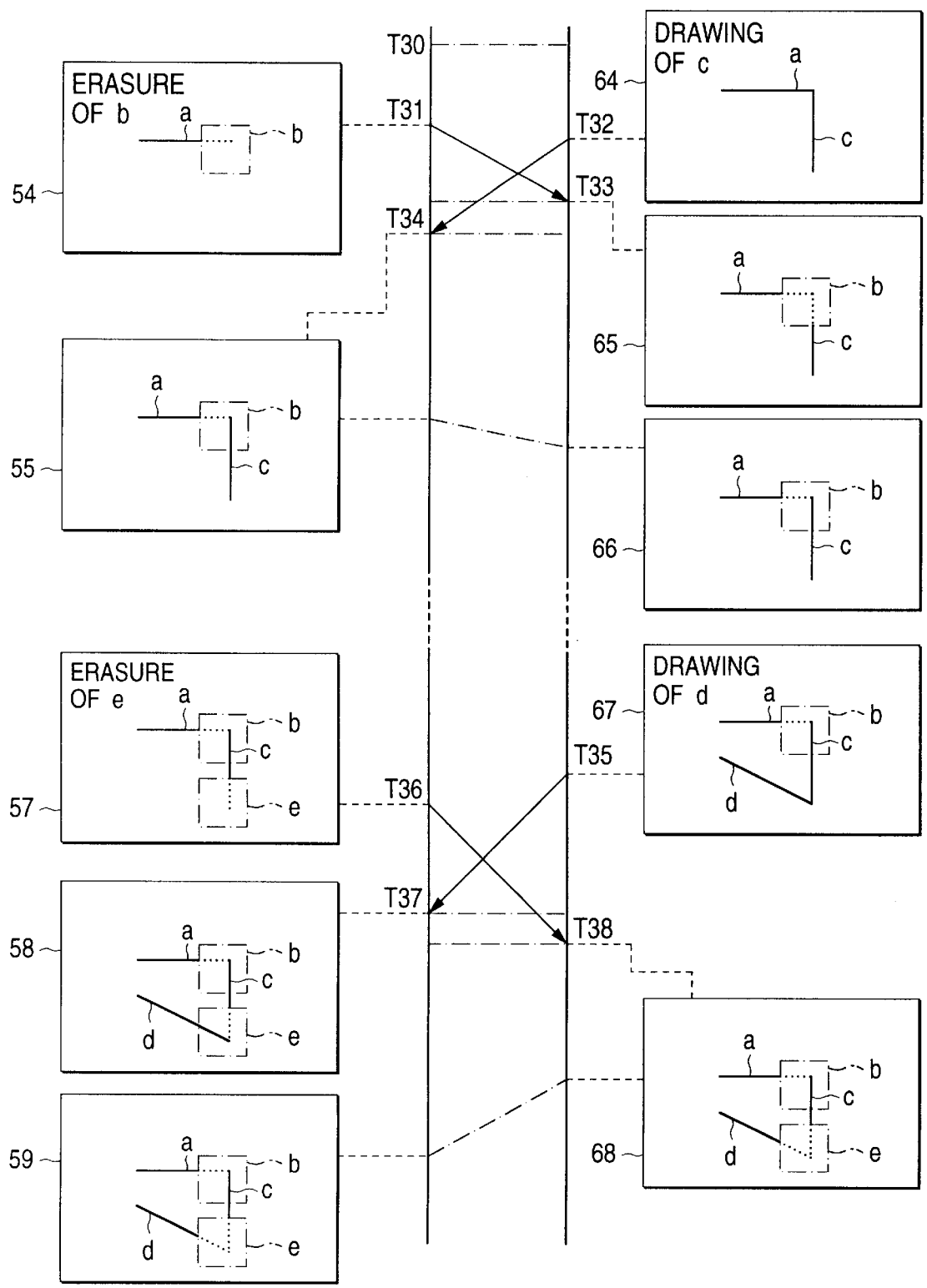
FIG. 7 is an example of images that are displayed when operations are performed on common drawing data from two terminal devices.
Figure 8:
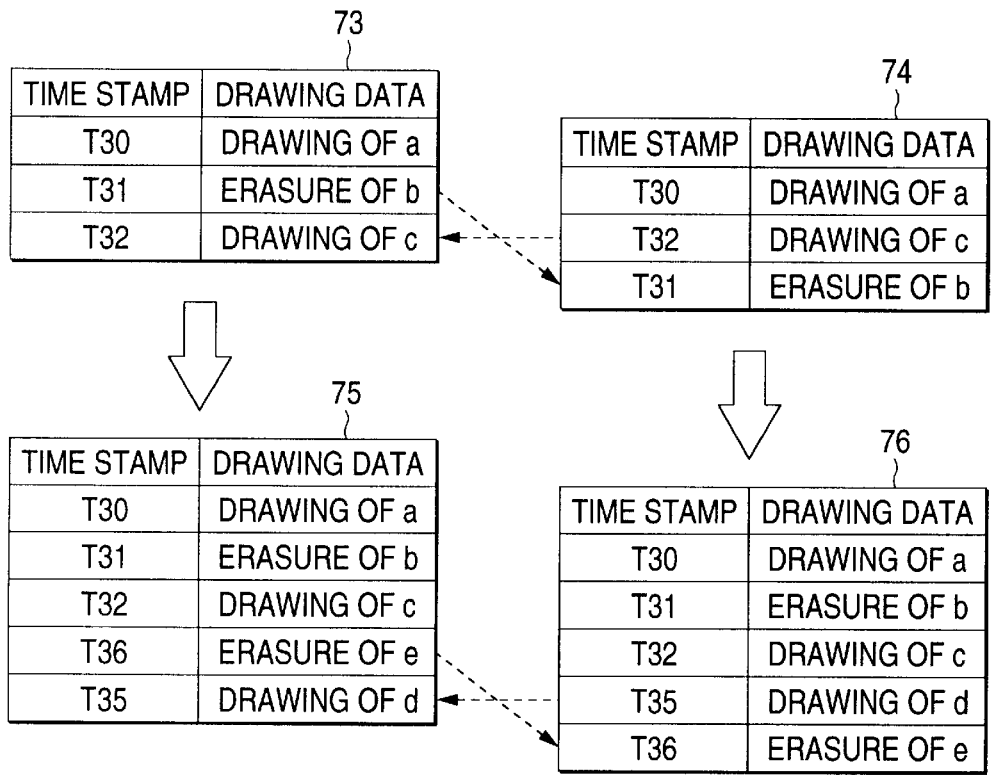
FIG. 8 shows an example of stored data of operation events when the operations are sequentially performed on the drawing data shared by the two terminal devices.

Next, a description will be made of a specific example (a line figure is drawn) of the drawing process that is performed between the drawing communication sections in this embodiment. FIG. 7 shows an example of images that are displayed when operations are sequentially performed on drawing data shared by two terminal devices (drawing communication apparatuses). FIG. 8 shows an example of stored data of operation events when the operations are sequentially performed on the drawing data shared by the two terminal devices. Referring to FIGS. 7 and 8, the example of the drawing process that is performed between the terminal devices.

It is assumed that a line segment a has been input and its display content is shared. It is assumed that at time T31 a rectangular region b is erased from a drawing image 54 of the first terminal device 30 and immediately thereafter, i.e., at time T32, a vertical line segment c is drawn in a drawing image 64 of the second terminal device 40. Before receiving drawing data from the other terminal device, the first terminal device 30 has the drawing image 54 and the second terminal device 40 has the drawing image 64. After time T33, i.e., after each terminal device has received the drawing data from the other terminal device, the line segment c is drawn in a drawing image 55 of the first terminal device 30 and the region b is erased from a drawing image 65 of the second terminal device 40.

At this time, as shown in FIG. 8, the drawing data storing sections 36 and 46 of the first and second terminal devices 30 and 40 have operation event sequences 73 and 74, respectively. In the operation event sequence 74 of the drawing data storing section 46 of the second terminal device 40, the erasure data that occurred at time T31, i.e., before the writing data was generated at time T32 is placed after the writing data. Therefore, a contradiction is detected by the above-described contradiction detecting process (FIG. 5) and redrawing is effected. As a result, the operation event sequence of the drawing data storing section 46 becomes equal to the operation event sequence 73 of the drawing data storing section 36 of the first terminal device 30. That is, the second terminal device 40 has a drawing image 66 whose display content is identical to that of the drawing image 55 of the first terminal device 30.

Then, it is assumed that at time T35, an oblique line d is drawn in a drawing image 67 of the second terminal device 40 and immediately thereafter, i.e., at time T36, a rectangular region e is erased from a drawing image 57 of the first terminal device 30. Before receiving drawing data from the other terminal device, the first and second terminal devices 30 and 40 have the display contents of the drawing images 57 and 67, respectively. After time T38, i.e., after each terminal device has received the drawing data from the other terminal device, the line segment d is drawn in a drawing image 58 of the first terminal device 30 and a corresponding content is displayed. The region e is erased from a drawing image 68 of the second terminal device 40 and a corresponding content is displayed. At this time, as shown in FIG. 8, operation event sequences 75 and 76, to which the operation events (drawing data operations) that have occurred after the above state and corresponding time stamps are added, are respectively stored in the drawing data storing sections 36 and 46 of the first and second terminal devices 30 and 40.

Therefore, in the operation event sequence 75 of the drawing data storing section 36 of the first terminal device 30, the operation event of the writing data that occurred at time T35, i.e., before the erasure data was generated at time T36 is placed after the operation event of the erasure data. Therefore, as in the above case, a contradiction is detected and redrawing is effected. As a result, the operation event sequence of the drawing data storing section 36 of the first terminal device 30 becomes equal to the operation event sequence 76 of the drawing data storing section 46 of the second terminal device 40. That is, the first terminal device 30 has a drawing image 59 whose display content is identical to that of a drawing image 68 of the second terminal device 40.

The drawing communication apparatus according to the first embodiment can be so constructed that each terminal device is solely used when no communication has been established with another terminal device, or starts communicating with another terminal device in the midst of its use. In such cases, it is necessary to transmit, in advance, common drawing data that is to become an operation object of another terminal device to newly communicate with. Preprocesses shown in FIGS. 9(a) and 9(b) are performed for that purpose.

Figure 9:
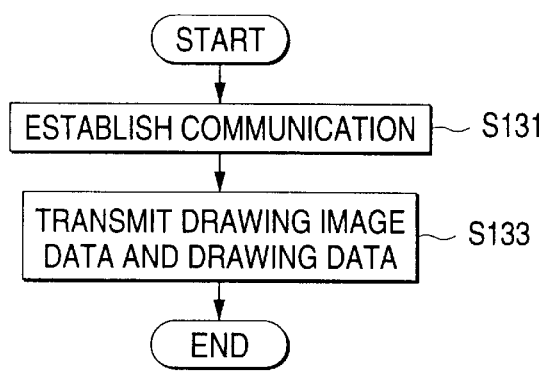
FIGS. 9(a) and 9(b) are flowcharts showing preprocesses that are performed before communication is started.
Figure 9:
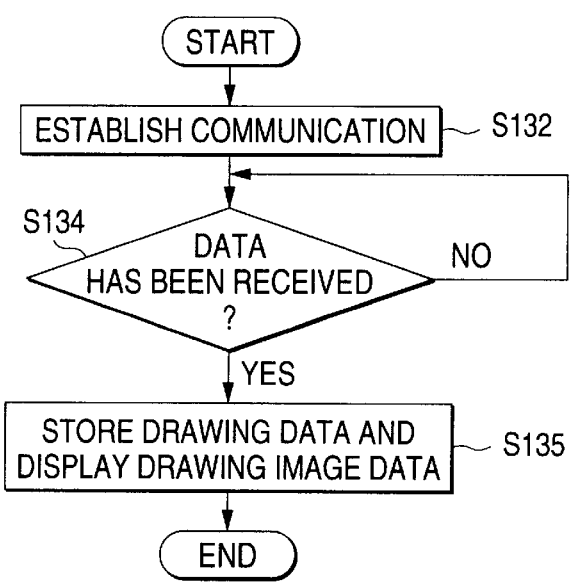

FIGS. 9(a) and 9(b) are flowcharts of preprocesses that are performed before communication is started. For example, assume that the first terminal device 30 starts communicating with the second terminal device 40 in the midst of its use. In this case, the first terminal device 30 performs the process of FIG. 9(a) and the second terminal device 40 performs the process of FIG. 9(b). First, an ordinary communication initiating process (step S131 or S132) is performed in each preprocess. Then, in the first terminal device 30, drawing image data of the output section 32 and drawing data of the drawing data storing section 36 are transmitted (step S133). During this operation, the second terminal device 40 waits for data reception (step S134). Upon reception of the data, the drawing image data is sent to the output section 42 and the drawing data is stored into the drawing data storing section 46 (step S135). As a result, the first and second terminal devices 30 and 40 have the same data, and thereafter the process can proceed using the same drawing image.

Second Embodiment

Figure 10:
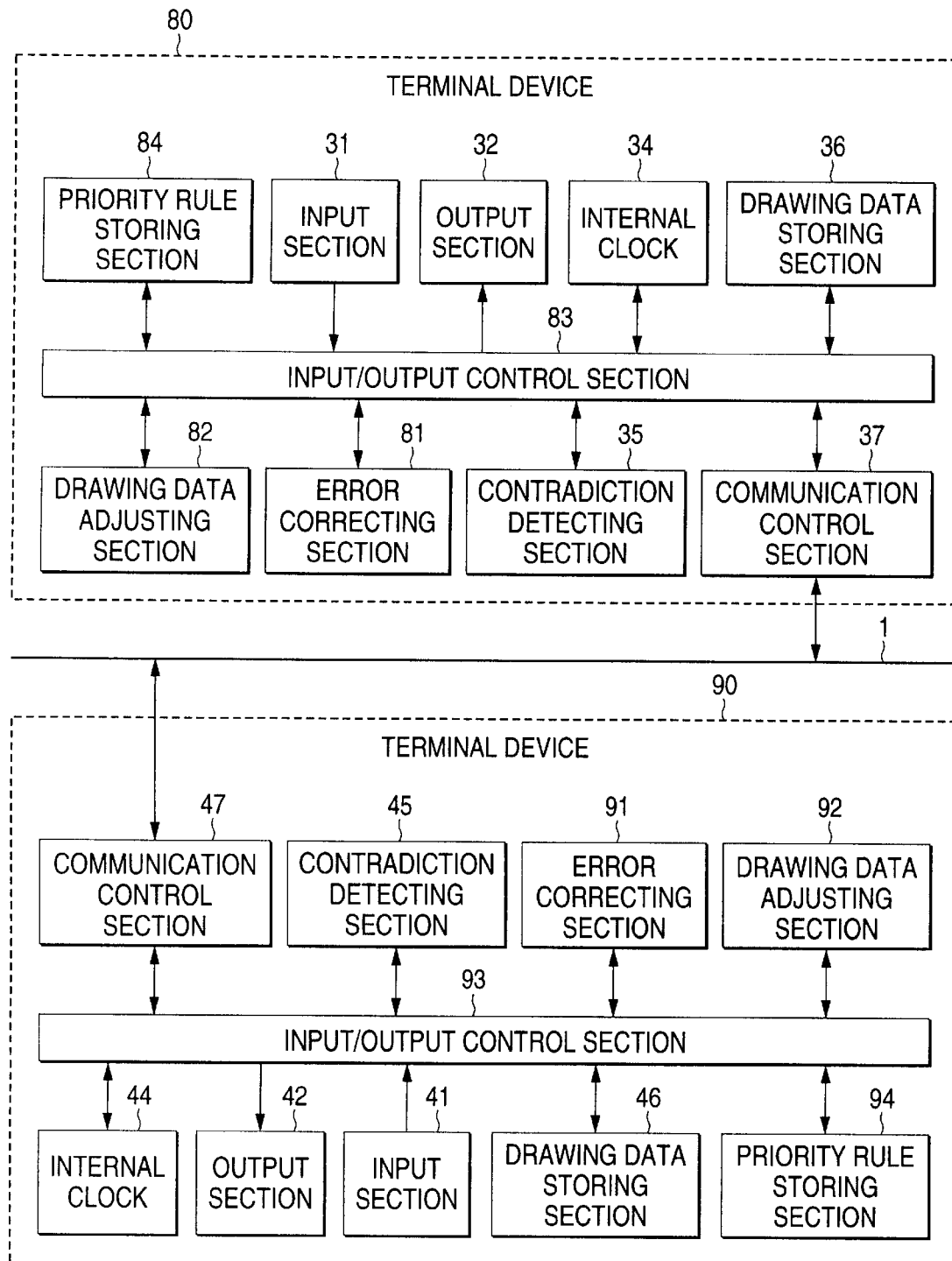
FIG. 10 is a block diagram showing a configuration of the main part of a drawing communication apparatus according to a second embodiment of the invention.

FIG. 10 is a block diagram showing a configuration of the main part of a drawing communication apparatus according to a second embodiment of the invention. In FIG. 10, a plurality of drawing communication apparatuses including a third terminal device 80 and a fourth terminal device 90 are connected to a communication line 1. As in the case of the first embodiment, the following description will be directed to the third terminal device (drawing communication apparatus) 80 unless it is necessary to describe other terminal devices for some specific purpose. The same system components as in the first embodiment are given the same reference numerals, and descriptions therefor will be omitted unless they are necessary for some specific purpose.

In the third terminal device (drawing communication apparatus) 80 shown in FIG. 10, an error correcting section 81 stores an error between the internal clocks 34 and 44 of the third and fourth terminal devices 80 and 90, and corrects time stamps of drawing data received through the communication control section 37. A drawing data adjusting section 82 manages a data storing time, i.e., a time for which drawing data is stored in the drawing data storing section 36 of the third terminal device 80, and deletes data which has been stored for a period longer than the data storing time. A priority rule storing section 84 stores other conditions that are used to determine the order of two drawing data having the same time stamps.

Figure 11:
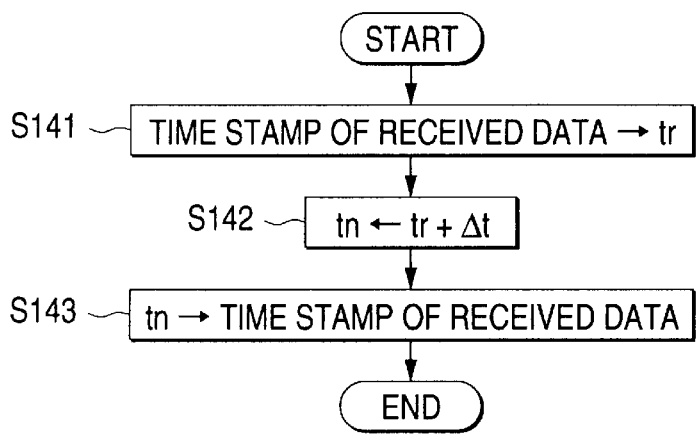
FIG. 11 is a flowchart showing an outline of a time stamp correcting process performed by an error correcting section.

FIG. 11 is a flowchart showing a time stamp correcting process performed by the error correcting section 81. In FIG. 11, an error $\Delta t$ means a reading of the internal clock of the associated device, for instance, the internal clock 34 of the third terminal device minus a reading of the internal clock of the other terminal that has transmitted the drawing data, for instance, the internal clock 44 of the fourth terminal device 90. If the internal clock of the other terminal is faster than that of the associated device, the error $\Delta t$ becomes a negative number.

Upon the start of the time stamp correcting process, a time stamp is extracted from received drawing data and represented by tr (step S141). In step S142, the time stamp tr plus the error $\Delta t$ is represented by tn, which is therefore a corrected time stamp. In step S143, the corrected time stamp tn is substituted for the time stamp of the drawing data. And the correcting process is finished.

For example, if the reading of the internal clock 34 of the third terminal device 80 is 5 seconds slower than that of the internal clock 44 of the fourth terminal device 90, the error $\Delta t$ is −5 sec. If the received drawing data has a time stamp of 1:23:45, it is corrected to 1:23:40 by the above time stamp correcting process. As a result, although the readings of the internal clocks 44 and 34 at the occurrence of the drawing data are 1:23:45 and 1:23:40, respectively, the order of occurrences of drawing data which is identical to the real order can be obtained by comparing the received drawing data with the drawing data that has occurred in the associated device (third terminal device 80).

The error $\Delta t$ may be input by a user every time each terminal device is used. Alternatively, it may be input when each terminal device is first used, and fixed thereafter. In those cases, the user inputs the error $\Delta t$ by comparing readings of respective internal clocks. Where it is needed to frequently communicate with another person who is located in a place with a time difference using the drawing communication apparatus, the latter method is preferably used to avoid time and labor of inputting errors $\Delta t$ every time the apparatus is used. Further, the above description is directed to the case of involving two terminal devices. Where three or more terminal devices are involved, errors for the respective devices may be stored to effect corrections for the respective devices. Further, the error setting can be made more easily if it is performed automatically when the apparatus is used according to setting procedures described later in connection with FIGS. 13(a) and 13(b).

Figure 12:
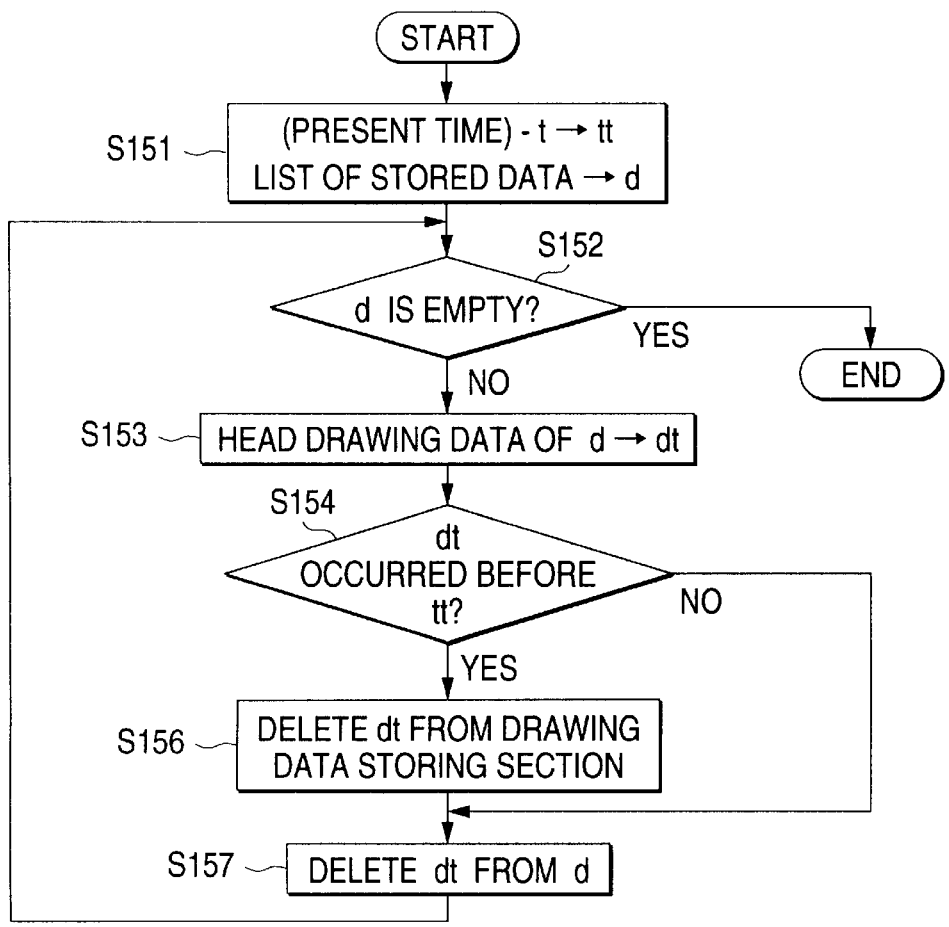
FIG. 12 is a flowchart showing a drawing data adjusting process performed by a drawing data adjusting section.

FIG. 12 is a flowchart showing a drawing data adjusting process that is performed by the drawing data adjusting section 82. In the drawing data adjusting section 82, the time t of storing drawing data is set long enough not to affect the above-described contradiction detecting process (see FIG. 5). Upon the start of the process, the present time minus the storing time t is represented by tt, and a list of data stored in the drawing data storing section 35 is represented by d (step S151). In step S152, it is judged whether the list d is empty. If the judgment is affirmative, the process is finished. Otherwise, the head drawing data of the list d is represented by dt (step S153). In step S154, the time stamp of the data dt and the time tt are compared with each other. If the data dt is data that occurred before the time tt, the data dt is removed from the drawing data storing section 36. Since one data adjusting operation has been completed, the data dt is removed (step S156) from the list d irrespective of the judgment result of step S154. The process returns to step S152.

By executing the above process, all the drawing data that occurred before the time tt are removed from the drawing data storing section 36. The storing time t is set in advance in a fixed manner, or input every time the apparatus is used. According to these procedures, the storing time t is set manually. Alternatively, the storing time t can be set more easily if it is set automatically when the apparatus is used according to the procedures described later in connection with FIGS. 13(a) and 13(b).

Figure 13:
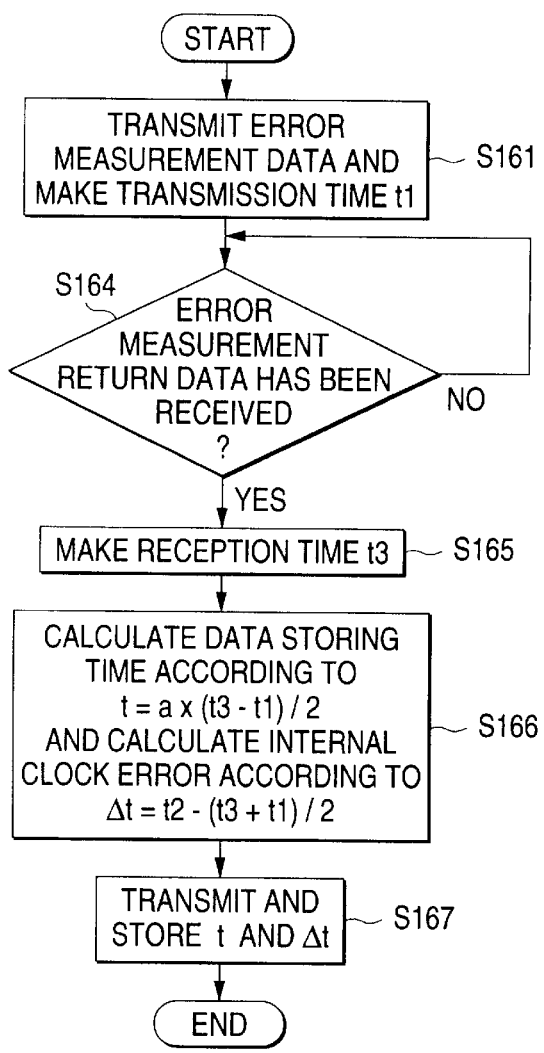
FIGS. 13(a) and 13(b) are flowcharts showing a loop-back process for automatically determining a storing time t and an error Δt in a relationship between a third terminal device and a fourth terminal device.
Figure 13:
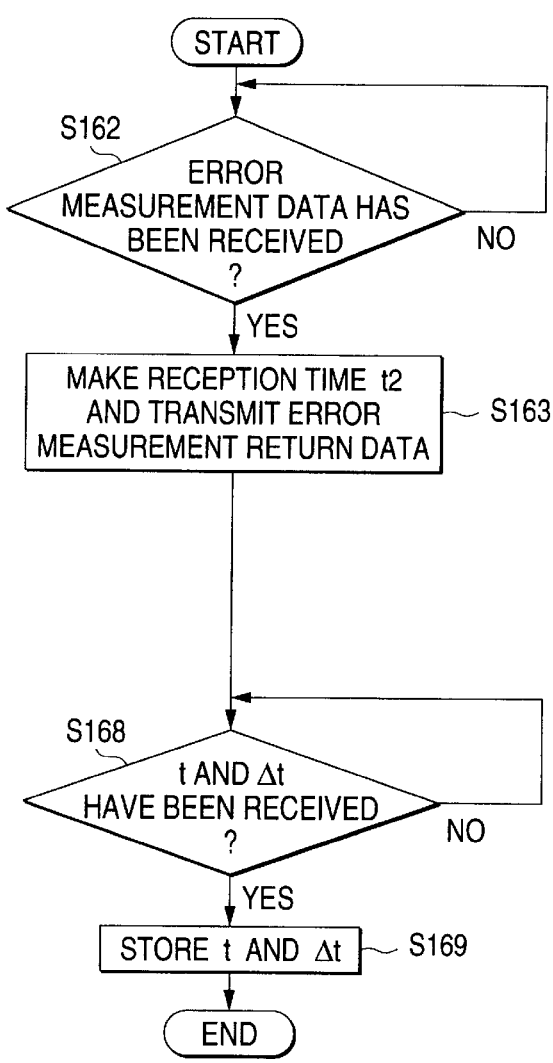

FIGS. 13(a) and 13(b) are flowcharts showing a loop-back process for automatically determining the storing time t and the error $\Delta t$ in a relationship between the third terminal device 80 and the fourth terminal device 90. For example, the third terminal device 80 transmits error measurement data to the fourth terminal device 90, and causes a reading of its own internal clock 34 at the time of the transmission to be represented by t1 (step S161). In step S164, the third terminal device 80 waits for error measurement return data. In step S162, the fourth terminal device 90 waits for transmission of error measurement data. Upon receiving the error measurement data, the fourth terminal device 90 causes a reading of the internal clock 44 at the time of the reception to be represented by t2, and transmits error measurement return data that includes data indicating the time t2 (step S163). In step S168, the fourth terminal device 90 waits for a storing time t and an error $\Delta t$ that will be determined by the third terminal device 80.

On the other hand, upon reception of the error measurement return data (step S164), the third terminal device 80 causes a reading of the internal clock 34 at the time of the reception to be represented by t3 (step S165). Further, based on the data of the time t1, t2 and t3, the third terminal device 80 calculates the data storing time t according to an equation a x (t3−t1)/2 and the internal clock error A according to an equation t2−(t3+t1)/2 (step S166).

That is, the data storing time t is calculated such that an approximate value (t3−t1)/2 of the time required for single-way transmission is calculated from a time t3−t1 that is required for go-and-return transmission of error measurement data, and then multiplied by a factor a so that the data storing time t includes a variation of the practical communication time. The internal clock error $\Delta t$ is calculated subtracting, from the actual reception time t2 of the fourth terminal device 90, a mean value (t3+t1)/2 of the transmission time t1 and the reception time t3 of the third terminal device 80, which mean value is assumed to be the reception time of the fourth terminal device 90.

In step S167, the data storing time t and the internal clock error $\Delta t$ that have been calculated by the third terminal device 80 are transmitted to the fourth terminal device 90, and stored into the drawing data adjusting section 82 and the error correcting section 81, respectively. Upon receiving the data storing time t and the internal clock error $\Delta t$ (step S168), the fourth terminal device 90 stores the data storing time t into the drawing data adjusting section 92 and stores the internal clock error Δt into the error correcting section 91 as an error −Δt of the terminal device 90 (step S169).

It is basically sufficient that the above loop-back process be performed once when the communication line is established, i.e., when the apparatus is first used. However, where it is expected that the data storing time t or the internal clock error Δt varies during communications, the apparatus may be so adapted that the above process is executed again at an arbitrary time point, assuring that the data storing time t and the internal clock error Δt always have appropriate values.

Figures 14, 15:
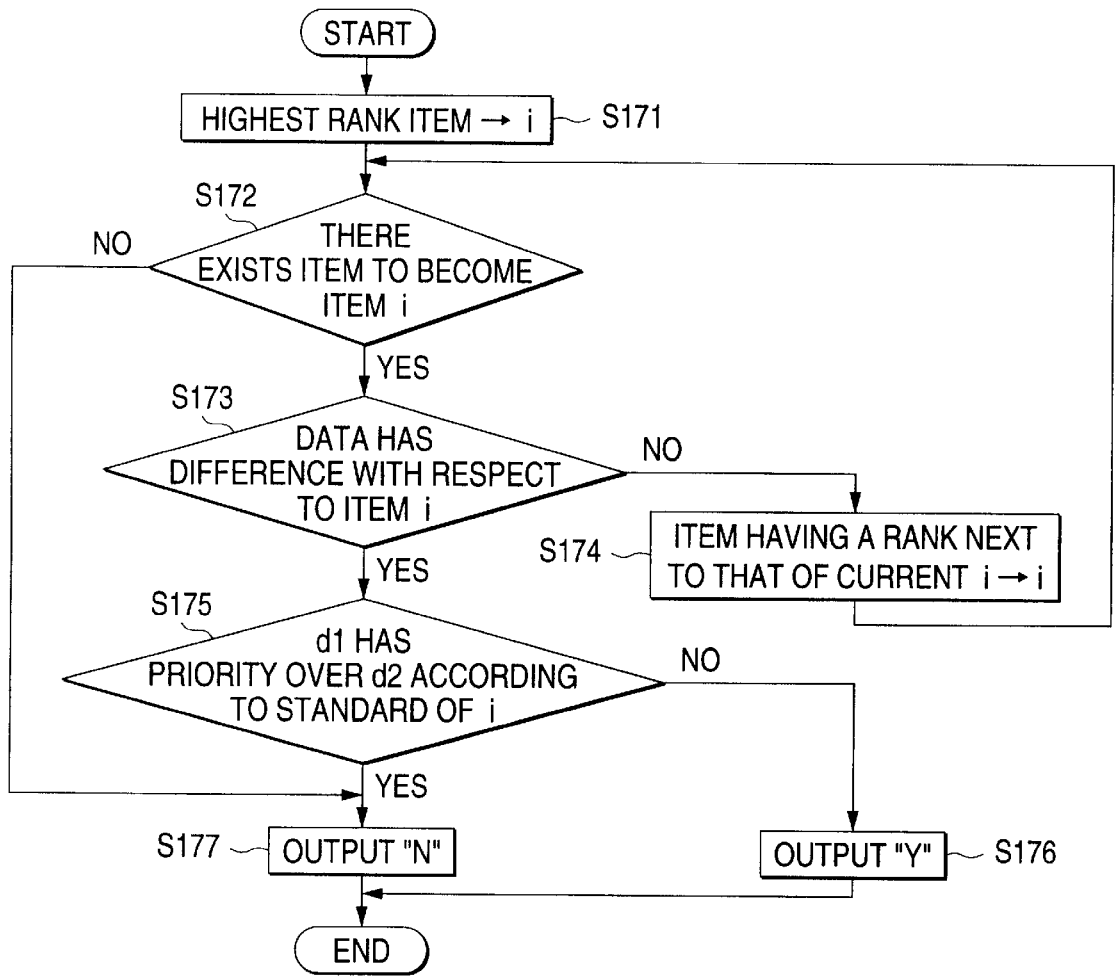
FIG. 14 shows a structure of data retained by a priority rule storing section.
FIG. 15 is a flowchart showing a judgment process based on the data of the priority rule storing section when time stamps are the same.

As mentioned above, the drawing communication apparatus of the second embodiment is provided with the priority rule storing section 84, which stores other conditions (priority rules) that are used to determine the order of two drawing data having the same time stamps. FIG. 14 shows an example of data retained by the priority rule storing section 84. As shown in FIG. 14, the priority rule data stored in the priority rule storing section 84 are such that a plurality of items are given ranks and judgment standards are described for the respective items. In FIG. 14, for example, the first-line item (first-rank item) is "kind of data" and the corresponding standard means that writing data has priority to erasure data. Data given priority is regarded as new data in terms of the time stamp comparison. Conversely, if expressed as a priority rule (judgment standard), the time stamp comparison becomes "data having a newer time stamp has priority." Since time stamps are generated by the internal clock when operation events occur, they are codes indicating an order of occurrences of the operation events. Thus, the priority order is judged according to the order of occurrences.

Next, a description will be made of a judgment process according to the priority rules (judgment standards) of the priority rule storing section 84 using, by way of example, a case where time stamps are the same. FIG. 15 is a flowchart showing a judgment process based on the data of the priority rule storing section 84 when time stamps are the same. Upon the start of the process, the highest rank item is extracted and made item i (step S171). If there exists an item to become item i (step S172), data are compared with each other according to a judgment standard of item i and it is judged whether the data have a difference with respect to item i (step S173). If there is no difference, the next rank item is made item i (step S174). Then, the process returns to step S172, to repeat the process of step S172 onward. On the other hand, if there is a difference, it is checked whether a time stamp d1 has priority over a time stamp d2 according to the standard of item i (step S175). If the judgment is negative, "Y" is output (step S176). If the judgment is affirmative, or if there is no item to become item i, "N" is output (step S177).

When the judgment process is effected using the priority rules (judgment standards) of the priority rule storing section 84, for instance, when no identical device IDs are found according to the third-rank judgment standard, a priority order can be determined for all the data set.

As described above, in the drawing communication apparatus according to the invention, a difference between display contents of a plurality of terminal devices is corrected quickly. Therefore, users can, for instance, hold a meeting while looking at the same display image. Further, the invention can provide the drawing communication apparatus which is free of a problem that operation events are given an erroneous order due to errors of the internal clocks, and is superior in ease of operation.

What is claimed is:

1. A drawing communication apparatus in which drawing data as an object of operation events including writing and erasure is shared by at least two competing drawing communication apparatuses, comprising:

code generating means for generating codes indicating an order of occurrence of competing operation events in one of the at least two apparatuses issuing the competing operation events;

error correcting means for storing error data indicating non-synchronization of internal clocks of the at least two apparatuses, and for correcting the codes using the error data;

drawing data storing means for storing data of the operation events together with the codes in an order of reception in the at least two apparatuses, the order of reception may be different than the order of occurrence indicated by the stored codes;

drawing means for drawing according to the stored operation events based on the order of reception;

contradiction detecting means for detecting a contradiction between the order of reception of the operation events whose data are stored in the drawing data storing means and the order of occurrence indicated by the stored codes;

control means for determining, when the contradiction detecting means has detected a contradiction, a processing order of the contradiction-detected operation events based on the order of occurrence indicated by their respective codes; and redrawing means for redrawing the drawing performed by the drawing means based on the processing order determined by the control means, when the contradiction detecting means has detected the contradiction.

2. A drawing communication apparatus in which drawing data is shared by at least two competing drawing communication apparatuses and operation events including writing and erasure are performed on the shared drawing data, comprising:

code generating means for generating codes indicating an order of occurrence of competing operation events in one of the at least two apparatuses issuing the competing operation events;

error correcting means for storing error data indicating non-synchronization of internal clocks of the at least two apparatuses, and for correcting the codes using the error data;

drawing data storing means for storing data of the operation events together with the codes in an order of reception in the at least two apparatuses, the order of reception may be different than the order of occurrence indicated by the stored codes;

control means for rearranging, based on the codes, the operation events whose data are stored in the drawing data storing means into an order that is identical to the order of occurrence of the operation events, and for effecting the operation events with respect to the shared drawing data in the rearranged order.

* * * * *